UNITED STATES PATENT OFFICE.

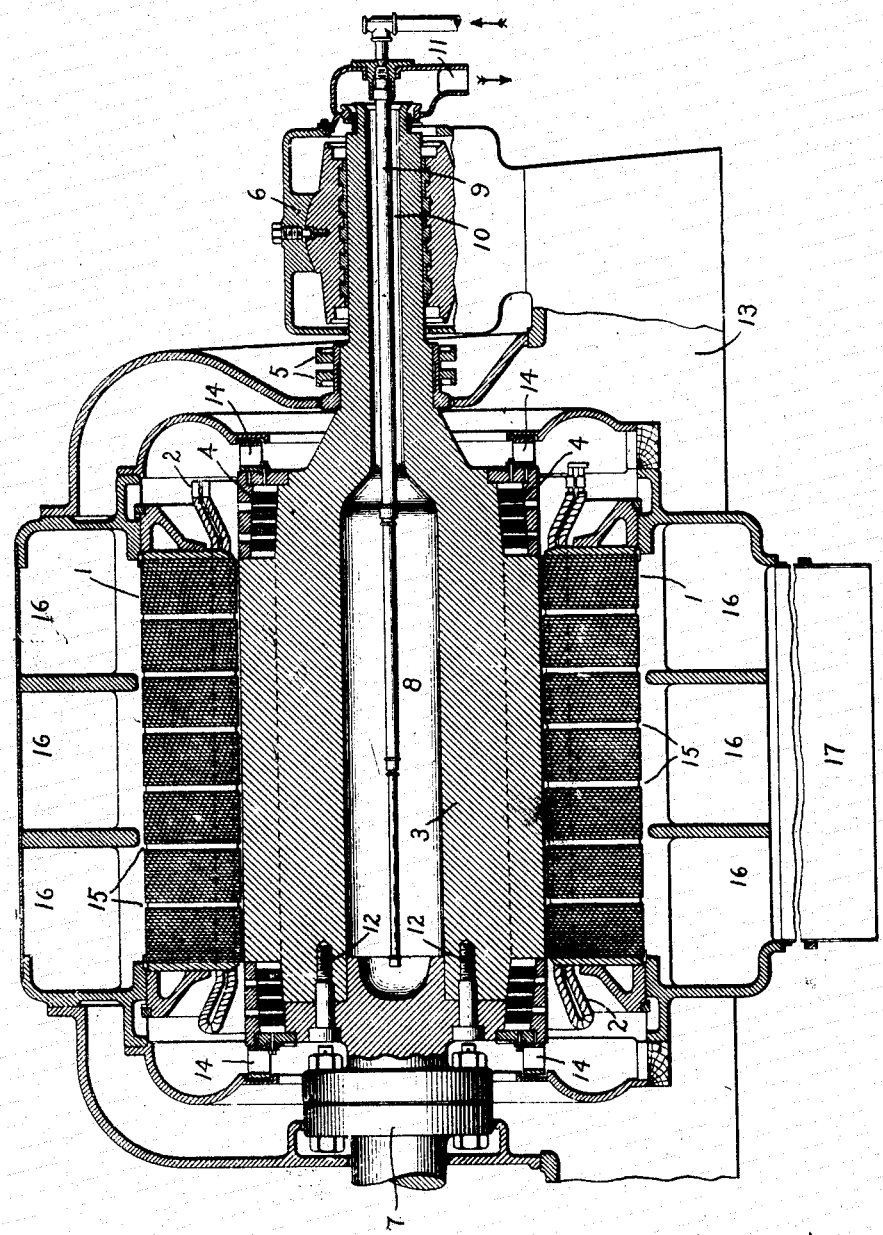

MARION A. SAVAGE, OF SCHENECTADY, NEW YORK, ASSIGNOR TO GENERAL ELECTRIC COMPANY, A CORPORATION OF NEW YORK.

DYNAMO-ELECTRIC MACHINE.

BEST AVAILABLE COPY

1,135,327.

Specification of Letters Patent.

Patented Apr. 13, 1915.

Application filed June 24, 1913. Serial No. 775,480.

*To all whom it may concern:*

Be it known that I, MARION A. SAVAGE, a citizen of the United States, residing at Schenectady, in the county of Schenectady, State of New York, have invented certain new and useful Improvements in Dynamo-Electric Machines, of which the following is a specification.

My invention relates to dynamo electric machines and particularly to the cooling of such machines.

The rotatable member of a dynamo electric machine which must revolve at a high speed, such as a turbine driven generator, is usually of a comparatively small diameter because of the high centrifugal strains to which it is subjected. Such a rotatable member becomes the limiting feature of a high speed generator because of the difficulty of keeping it cool.

My invention has for its object a novel construction and arrangement of parts whereby such a rotatable member, or any rotating member of a dynamo electric machine, may be kept cool in a simple and effective manner.

For a better understanding of my invention reference may be had to the following description taken in connection with the accompanying drawing, in which the single figure is a cross-sectional view of a dynamo electric machine embodying my invention.

In the drawing, I have illustrated my invention in connection with an alternating current machine, having a stationary and a rotatable member. The stationary member comprises a core 1 having slots in its inner periphery in which are placed windings 2. The rotatable member comprises a core 3 having windings 4 in slots in its outer periphery. This winding is supplied with excitation through collector rings 5, which are suitably connected to the winding 4. The rotatable member is mounted in bearings, one of which is shown at 6, and may be connected to a primary source of power such as a turbine through a coupling 7.

In accordance with my invention, the core 3 of the rotatable member is provided with a duct extending axially from one end of said member into but not through the same, said duct being shown in the form of a cavity 8 with an opening 10 to the cavity from one end of the core, the opening 10 being concentric with the axis of rotation of the core. Through substantially the center of this opening a pipe 9 of smaller diameter than the open end of said duct extends for conveying cooling fluid into the cavity. Preferably, this pipe extends substantially to the closed end of the cavity. The opening 10 is preferably of less diameter than the cavity. A discharge pipe 11 may be provided at the end of the opening 10, and as shown, may be suitably packed to prevent the escape of cooling fluid from the junction of the opening 10 and the discharge pipe 11. I have shown the core as being divided into two parts, the cavity being formed in one part and the other forming the closure for the cavity. The two parts have a shrink fit in order to prevent the escape of any of the cooling fluid. They also may be held together by the bolts 12.

The rotatable member is cooled by supplying cooling fluid, such as water, to the pipe 9 by which it is conveyed into the cavity 8. As the water becomes heated by coming into contact with the core, its specific gravity is decreased, and centrifugal force replaces it by cold water from the pipe 9, since the cold water has a higher specific gravity. In this way, the heated water occupies the central portion of the cavity and flows off through the opening 10 and the discharge pipe 11.

I have shown the stationary member as being cooled in a well known manner by means of air. Cool air is taken into the machine through its base 13 and is forced into the air gap between the stationary and rotatable members by means of fans 14 mounted on the ends of the core 3. The air then passes through ducts 15 in the core 1 of the stationary member, into passages 16 about the core 1, and out of the machine through an exit 17.

I desire it to be understood that my invention is not limited to the particular construction shown and described and I aim in the appended claims to cover all modifications which do not depart from the spirit and scope of my invention.

What I claim as new and desire to secure by Letters Patent of the United States, is:—

1. In a dynamo electric machine, a rotatable member having windings thereon, said member being formed with a cooling duct extending axially from one end of said member into but not through the same, a pipe of smaller diameter than the duct at its open end extending through substantially the center of the opening, whereby a cooling fluid supplied to said pipe will flow through the same into said duct and out again through the opening about said pipe.

2. In a dynamo electric machine, a rotatable member having windings thereon, said member being formed with a cooling duct extending axially from one end of said member into but not through the same, a pipe of smaller diameter than the duct at its open end extending through substantially the center of the opening, and a discharge pipe for the open end of the duct, whereby a cooling fluid supplied to said pipe will flow through the same into said duct and out again through the opening about said first mentioned pipe and then through said discharge pipe.

3. In a dynamo electric machine, a rotatable member comprising a core and windings thereon, said core having a cavity therein and an opening to the cavity from one end of said core, said opening being concentric with the axis of rotation of said core, and a pipe extending through substantially the center of said opening and into said cavity for conveying cooling fluid into said cavity, said fluid after cooling said core flowing off through said opening in said core about said pipe.

4. In a dynamo electric machine, a rotatable member comprising a core and windings thereon, said core having a cavity therein and an opening to the cavity from one end of said core, said opening being concentric with the axis of rotation of said core, and a pipe extending through substantially the center of said opening and into said cavity substantially to the closed end thereof for conveying cooling fluid into said cavity, said fluid after cooling said core flowing off through said opening in said core about said pipe.

5. In a dynamo electric machine, a rotatable member comprising a core and windings thereon, said core having a cavity therein and an opening to the cavity from one end of said core, said opening being concentric with the axis of said core, a pipe extending through substantially the center of said opening and into said cavity for conveying cooling fluid into said cavity, and a discharge pipe for said opening in the core, said fluid after cooling said core flowing off through said opening in said core and then through said discharge pipe.

6. In a dynamo electric machine, a rotatable member comprising a core and windings thereon, said core having a cavity therein and an opening to the cavity from one end of said core, said opening being of less diameter than said cavity, said opening being concentric with the axis of rotation of said core, a pipe extending through substantially the center of said opening and into said cavity substantially to the closed end thereof for conveying cooling fluid into said cavity, and a discharge pipe for said opening in the core, said fluid after cooling said core flowing off through said opening in said core and then through said discharge pipe.

In witness whereof, I have hereunto set my hand this 23rd day of June, 1913.

MARION A. SAVAGE.

Witnesses:
BENJAMIN B. HULL,
HELEN ORFORD.